United States Patent
Choudhury et al.

(10) Patent No.: US 10,651,471 B2
(45) Date of Patent: May 12, 2020

(54) CATHODES FOR LI-S BATTERIES (71) Applicant: Leibniz-Institut für Polymerforschung Dresden e.V., Dresden (DE)

(72) Inventors: Soumyadip Choudhury, Dresden (DE); Leonid Ionov, Dresden (DE); Manfred Stamm, Freitai-Pesterwitz (DE); Mukesh Agrawal, Bangalore Karnatka (IN); Marta Horecha, Dresden (DE)

(73) Assignee: Leibniz-Institut für Polymerforschung Dresden e.V., Dresden (DE)

( * ) Notice: Subject to any disclaimer, the term of this patent is extended or adjusted under 35 U.S.C. 154(b) by 65 days.

(21) Appl. No.: 15/534,741

(22) PCT Filed: Dec. 16, 2015

(86) PCT No.: PCT/EP2015/080059
§ 371 (c)(1),
(2) Date: Jun. 9, 2017

(87) PCT Pub. No.: WO2016/097029
PCT Pub. Date: Jun. 23, 2016

(65) Prior Publication Data
US 2017/0365851 A1    Dec. 21, 2017

(30) Foreign Application Priority Data
Dec. 17, 2014  (EP) .................................. 14198594

(51) Int. Cl.
| | | |
|---|---|---|
| C01B 31/02 | (2006.01) | |
| H01M 4/583 | (2010.01) | |
| C04B 38/00 | (2006.01) | |
| C04B 35/524 | (2006.01) | |
| C01B 32/05 | (2017.01) | |
| H01M 4/58 | (2010.01) | |
| H01M 10/052 | (2010.01) | |
| C04B 111/00 | (2006.01) | |

(52) U.S. Cl.
CPC .............. *H01M 4/583* (2013.01); *C01B 32/05* (2017.08); *C04B 35/524* (2013.01); *C04B 38/0022* (2013.01); *H01M 4/5825* (2013.01); *H01M 10/052* (2013.01); *C04B 2111/00793* (2013.01); *C04B 2111/00801* (2013.01); *C04B 2111/00853* (2013.01); *C04B 2235/5445* (2013.01); *C04B 2235/5454* (2013.01); *C04B 2235/5472* (2013.01)

(58) Field of Classification Search
CPC ....................................................... C01B 32/05
See application file for complete search history.

(56) References Cited

U.S. PATENT DOCUMENTS

| | | | | |
|---|---|---|---|---|
| 7,326,396 | B2 * | 2/2008 | Yu .......................... | C04B 38/045 423/445 R |
| 7,666,380 | B2 * | 2/2010 | Jaroniec ................... | B01J 21/18 264/43 |
| 8,366,979 | B2 * | 2/2013 | Dai .......................... | B01J 20/20 264/49 |
| 2005/0260118 | A1 | 11/2005 | Lu et al. | |

OTHER PUBLICATIONS

International Search Report and the Written Opinion of the International Searching Authority corresponding to International Patent Application No. PCT/EP2015/080059 (12 pages) (dated Feb. 16, 2016).
Liang et al. "Mesoporous Carbon Materials: Synthesis and Modification" *Angewandte Chemie* 47:3639-3717 (2008).
Meng et al. "Ordered Mesoporous Polymers and Homologous Carbon Frameworks: Amphiphilic Surfactant Templating and Direct Transformation" *Angewandte Chemie* 117:7215-7221 (2005).

\* cited by examiner

*Primary Examiner* — Stuart L Hendrickson
(74) *Attorney, Agent, or Firm* — Myers Bigel, P.A.

(57) ABSTRACT

The present invention concerns a process for the preparation of a porous carbon structure comprising the steps: a) providing a template comprising voids, b) filling of at least part of the voids with a precursor for the formation of the porous carbon structure, c) carbonizing the precursor for the formation of the porous carbon structure and d) removing at least part of the template. In preferred embodiments the precursor for the formation of the porous carbon structure is a formaldehyde-phenol resin, especially a cross-linked resorcinol-formaldehyde resin. The template further preferably comprises a block copolymer and an amphiphilic molecule, wherein the block copolymer comprises polymeric units of at least one lipophilic monomer and polymeric units of at least one hydrophilic monomer. Further preferred is a process wherein the template comprises a bimodal mixture of particles of silicon dioxide.

20 Claims, 7 Drawing Sheets

CATHODES FOR LI-S BATTERIES

OBJECT OF THE INVENTION

It is the object of the present invention to provide a process for the preparation of porous cathodes for Li—S batteries with inverse template structure, especially porous cathodes prepared by using carbonized resorcinol-formaldehyde resin.

BACKGROUND OF THE INVENTION

Development of methods for storage of electrical energy has become highly important in recent time. Two main general approaches for reversible storage of electric energy are commonly used. The first one is supercapacitors, where energy is stored in the form of an electric double layer. In the second approach, the energy is stored in the form of chemical energy in rechargeable batteries. While the supercapacitors allow higher power density, the rechargeable batteries are able to provide higher energy density. Among all variety of rechargeable batteries, ones based on lithium deserve particular attention. In fact, lithium is the lightest metal and has the highest oxidation potential among the metals that allows much higher energy density comparing, for example, to Ni—Cd rechargeable batteries. Currently, Li-ion batteries based on $LiMnO_2$ and $LiCoO_2$ cathodes are practically used. These Li-ion batteries provide good cycling and very high Coulombic efficiency. On the other hand, they suffer from insufficient energy density. For example, the distance which can be traveled by a car equipped with a Li-ion battery is about 50-160 km, which in many cases is insufficient for everyday use. Li—S batteries are the emerging class of rechargeable batteries, which potentially can provide much higher energy density. Although the lithium-sulfur system operates at a comparably low average potential of 2.1 V against $Li^+/Li$, it shows a high theoretic specific energy of 2600 Wh/kg due to the extraordinary theoretical specific capacity of 1675 $mAh/g_s$ ($g_s$ stands for per gram of sulfur).

The essential element of Li—S batteries is the sulfur cathode. Sulfur itself is electrically insulating and therefore composite cathodes, which consist of sulfur and porous conductive materials such as carbon, are used. Different carbon materials including acetylene black, carbon nanotubes, graphene, CMK-3 and microporous activated carbon fibers were used as conductive component. Typically, these carbon materials are powders, which consist of grains with certain size. The porosity of these materials is controlled by the size of the grains and internal porosity of the grains. Very recently, polymers were introduced as precursors for design of porous carbon cathodes. Due to their flexibility, polymers may be used for fabrication of carbon materials with various micro and nano-morphologies. For example, carbonization of polyacrylonitrile (PAN) mixed with $Na_2CO_3$, poly(m-ethyl methacrylate) (PMMA)—PAN blends, polymer; fibers prepared by electrospinning, polypyrole, sucrose, formaldehyde-phenol resin mixed with tetraethyl orthosilicate were used to prepare porous carbon cathodes. Due to interconnectivity of pores and carbon phase as well as large surface area, opal and inverse-opal•structures deserve particular interest as candidate for possible carbon structures. For example, Schuster, J.; He, G.; Mandlmeier, B.; Yim, T.; Lee, K. T.; Bein, T.; Nazar, L. F., Spherical Ordered Mesoperaus Carbon Nanoparticles with High Porosity for Lithium-Sulfur Batteries, Angewandte Chemie, International Edition 2012; 51, (15), 3591-3595 disclose fabrication of opal-like porous carbon structure using PMMA particles as template, which was filled with $SiO_2$ and PMMA was replaced by CMK-3 carbon. Inverse-opal like carbon structures were also prepared by carbonization of poly(furfuryl alcohol) and demonstrated very good cycling properties.

DETAILED DESCRIPTION

It is one purpose of the present invention to provide new methods for preparation of porous carbons, which are suitable for design of cathodes for Li—S batteries.

The present invention concerns a process for the preparation of a porous carbon structure comprising the following steps:
a) providing a template comprising voids,
b) filling of at least part of the voids with a precursor for the formation of the porous carbon structure,
c) carbonizing the precursor for the formation of the porous carbon structure and
d) removing at least part of the template.

This procedure allows the use of material for the template that will provide a porous carbon structure for use as sulfur-carbon cathodes with an optimized microstructure, while it allows at the same time to choose a precursor for the porous carbon structure, which provides porous carbon with improved electrochemical properties for use in sulfur-carbon cathodes. This procedure provides well defined carbon structures with regular micro structures and disordered nanostructures that result in a high conductivity and a high initial capacity in sulfur-carbon cathodes. Preferred is the aforementioned process wherein the precursor for the formation of the porous carbon structure is a formaldehyde-phenol resin. It can be easily prepared in the template by soaking the template in a mixture of the starting materials for the preparation of the precursor. The soaked template is subsequently heated mildly to provide the cross-linked polymer, which is the precursor for the formation of the porous carbon structure. More preferable the precursor for the formation of the porous carbon structure is a resorcinol-formaldehyde resin. Resorcinol-formaldehyde resins provide carbon that is disordered in the nano scale and partially graphitized and has a high conductivity and a high capacity.

A preferred process of the present invention is a process as described above comprising the following steps:
a) providing a solution comprising a solvent or a mixture of solvents, a block copolymer and an amphiphilic molecule,
b) producing a body by evaporation of the solvent,
c) removal of the amphiphilic molecules to produce a template comprising voids,
d) filling of at least part of the voids with a precursor for the formation of the porous carbon structure,
e) carbonization of the precursor for the formation of the porous carbon structure and removal of the block copolymer by heating,
wherein the block copolymer comprises polymeric units of at least one lipophilic monomer and polymeric units of at least one hydrophilic monomer.

In such a process, the polymeric units of the at least one lipophilic monomeric unit tend to attach themselves to the lipophilic parts of the amphiphilic molecules and the polymeric units of the at least one hydrophilic monomer tend to attach themselves to the hydrophilic parts of the amphiphilic molecules, resulting in an ordered structure. The ordered structure has been found to have bicontinuous gyroid morphology. A bicontinuous gyroid morphology means infinitely connected ordered or periodic three dimensional structures. When the amphiphilic molecules are removed, they leave voids that have the form of channels in the ordered structure. These voids in the form of channels are connected with each other and allow the precursor solution of the precursor for the formation of the porous carbon structure to easily penetrate the voids in the template by capillary force. They also provide the resulting carbon cathode with a highly porous ordered structure with a high surface area.

According to one preferred embodiment of the present invention, the voids of the template comprising voids do not comprise a precursor for the formation of the porous carbon structure before filling of at least part of the voids with a precursor for the formation of the porous carbon structure, more preferably the voids do not comprise a resorcinol resin before filling at least part of the voids with a precursor for the formation of the porous carbon structure.

According to another preferred embodiment of the present invention, the template comprising voids is formed in the absence of a precursor for the formation of the porous carbon structure, more preferably it is formed in the absence of a resorcinol resin.

According to a preferred embodiment of the present invention, voids of the template comprising voids are free of any organic material. According to another preferred embodiment of the present invention, voids of the template comprising voids are free of any inorganic material. According to a particularly preferred embodiment of the present invention, voids of the template comprising voids are free of any organic material and free of any inorganic material.

Further preferred is such a process as directly aforementioned wherein in step c) the amphiphilic molecules are removed by soaking the body produced in step b) in a solvent, preferably in ethanol and more preferably in an ethanol/water mixture. This procedure allows a very easy and simple removal of the amphiphilic molecules without disturbing the structure of the remaining block copolymer which forms the template.

In one preferred embodiment the at least one hydrophilic monomer and the amphiphilic molecule comprise groups that allow the formation of hydrogen bonds between the part of the block copolymer comprising the hydrophilic monomer and the amphiphilic molecule. Preferably the aforementioned at least one hydrophilic monomer comprises at least one functional group selected from the group consisting of a nitrogen atom with one lone electron pair, an oxygen atom with two lone electron pairs and an fluorine atom and the amphiphilic molecule comprises at least one functional group selected from the group consisting of N—H and —O—H or the amphiphilic molecule comprises at least one functional group selected from the group consisting of a nitrogen atom with one lone electron pair, an oxygen atom with two lone electron pairs and a fluorine atom and the hydrophilic monomer comprises at least one functional group selected from the group consisting of N—H and —O—H. Preferably the at least functional group selected from the group consisting of N—H and —O—H are selected from the group consisting of a primary amine group a secondary amine group, a amide group, a carboxyl group or a hydroxyl group. These functional groups allow the formation of hydrogen bonds between the block copolymer and the amphiphilic molecule, which supports the formation of ordered structures with tunnel shaped elements.

Most preferably the block copolymer used in a process according to the present invention is a polystyrene—poly (4-vinylpyridine) block copolymer (P4VP). Further preferably the aforementioned amphiphilic molecule is selected from the group consisting of 3-pentadecylphenol (PDP) and 2-(4'-hydroxyphenylazo)benzoic acid (HABA). Most preferably the aforementioned amphiphilic molecule is 3-pentadecylphenol. Further preferably, the solvent mentioned in steps a) and b) of the above process is chloroform.

A preferred combination of the aforementioned block copolymer and the aforementioned amphiphilic molecule is the combination of a polystyrene—poly(4-vinylpyridine) block copolymer in combination with 3-pentadecylphenol as the amphiphilic molecule. Preferred is therefore a process as aforementioned wherein the solution in step a) comprises polystyrene—poly(4-vinylpyridine) block copolymer and 3-pentadecylphenol. Most preferably the solution in step a) consists of one or more solvents, polystyrene—poly(4-vinylpyridine) block copolymer and 3-pentadecylphenol. Such solutions form upon evaporation of the solvent in step b) of the aforementioned process complexes of the polystyrene—poly(4-vinylpyridine) block copolymer with 3-pentadecylphenol that have a gyroid morphology. According to one preferred embodiment, the solution in step a) does not comprise a precursor for the formation of the porous carbon structure, preferably the solution in step a) does not comprise a starting material for the preparation of a crosslinked formaldehyde-phenol resin.

A preferred process of the present invention is therefore a process as described above comprising the following steps:
a) providing a solution comprising chloroform, polystyrene—poly(4-vinylpyridine) block copolymer and 3-pentadecylphenol,
b) producing a body by evaporation of chloroform,
c) removal of the amphiphilic molecules by selective washing with an ethanol/water mixture to produce a template comprising voids,
d) filling of at least part of the voids with a starting material for the preparation of a cross-linked resorcinol-formaldehyde resin, and subsequent heating of the starting material to form a cross-linked resorcinol-formaldehyde resin
e) and carbonization of the precursor for the formation of the porous carbon structure and removal of the block copolymer by heating.

Figure 1:
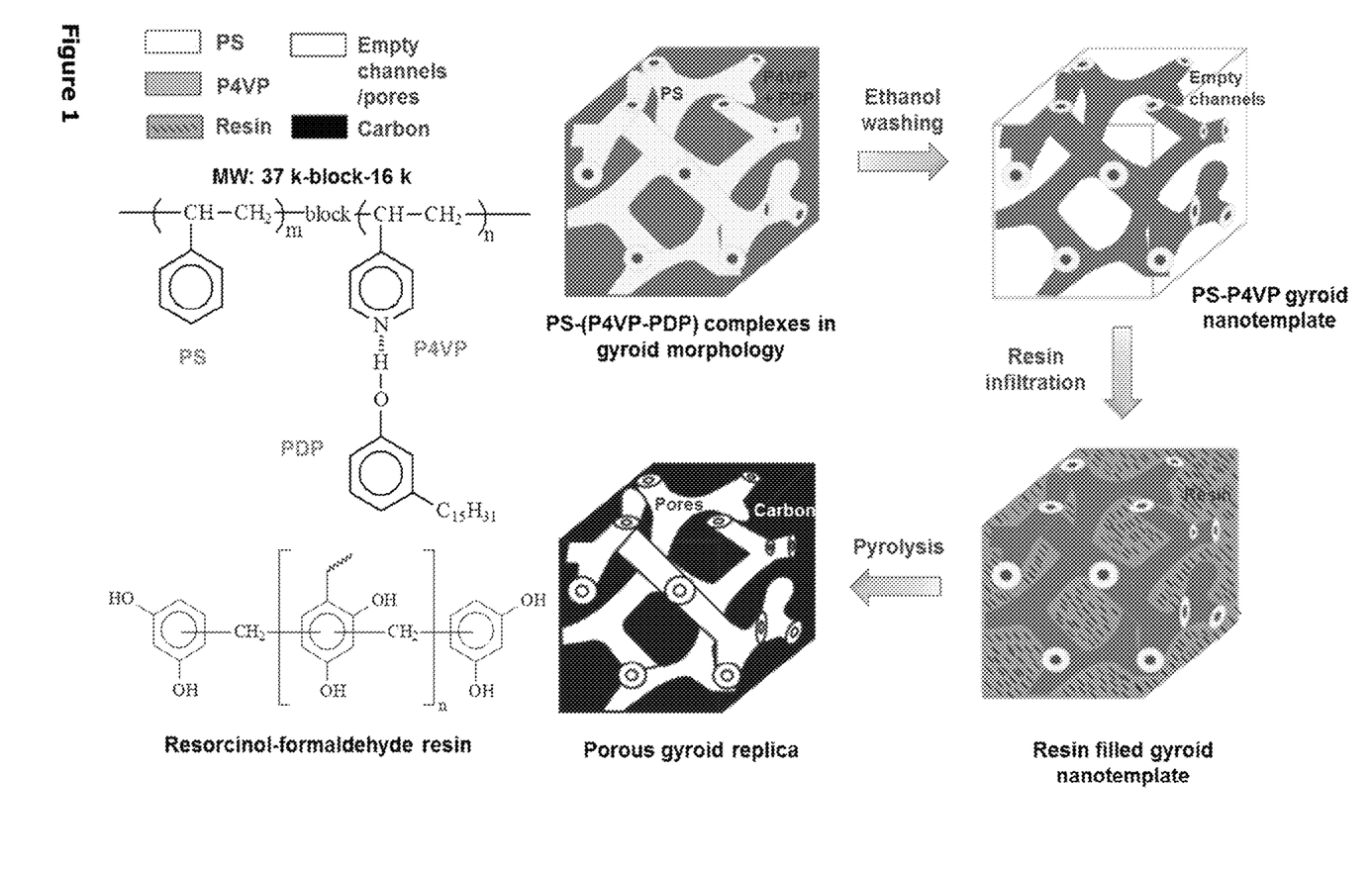
FIG. 1 describes the process of Example 1.

FIG. 1 describes the directly aforementioned process where a template is formed by evaporation of the solvent of a solution comprising a solvent (chloroform), polystyrene—poly(4-vinylpyridine) block copolymer and 3-pentadecylphenol. The complex of the polystyrene—poly(4-vinylpyridine) block copolymer with 3-pentadecylphenol having gyroid morphology is depicted in the first drawing. It has a bicontinuous gyroid morphology. The dark parts depict the space occupied by the polystyrene—poly(4-vinylpyridine) block copolymer and the white parts depict the space that was occupied by the 3-pentadecylphenol and now it is free space giving porous template to be filled with carbon precursor (FIG. 1, drawing 2). Owing to the hydrogen bonding interaction between hydroxyl groups and nitrogen atoms of pyridine rings, 3-pentadecylphenol prefers to assemble into the poly(4-vinylpyridine) phase. A selective washing of 3-pentadecylphenol molecules from block copolymer films in ethanol, which was confirmed by FTIR spectroscopy, resulted in the formation of a nanoporous template with gyroid morphology exhibiting the polystyrene struts coated with poly(4-vinylpyridine) chains (FIG. 1, drawing 2). The resulting nanoporous gyroid template is depicted in FIG. 1, Drawing 2, wherein the dark part depicts the space occupied by the block copolymer and the white parts depict the void channels.

Subsequently the nanoporous gyroid template was impregnated with starting material (carbon precursor) for the preparation of resorcinol-formaldehyde resin (dotted dark part in FIG. 1 drawing 3) which will be crosslinked after complete filling of the void spaces to provide the resin filled gyroid nanoporous template (FIG. 1, Drawing 3). As visualized in microscopic analysis (scanning electron microscopy, transmission electron microscopy), template films have nano-scaled interconnected channels, therefore capillary forces can also be expected to facilitate the penetration of starting materials into the film. In a subsequent step, the sample is heated, which results in the formation of cross-linked resorcinol-formaldehyde resin inside the gyroid template. Finally, the resin filled sample is pyrolyzed at elevated temperature in an inert media to obtain highly porous gyroid carbon replicas. Pyrolysis not only converts the cross-linked resin into the carbon but also removes the block copolymer phase leaving behind the interconnected porous carbon network (FIG. 1, drawing 4) with high surface area, which is around 885 $m^2/g$. The porous carbon was characterized by X-ray photoelectron spectroscopy (XPS) and Raman spectroscopy. The obtained results suggest that the carbon material of the fabricated sample is a mixture of disordered and graphitized carbon structures.

Figure 2:
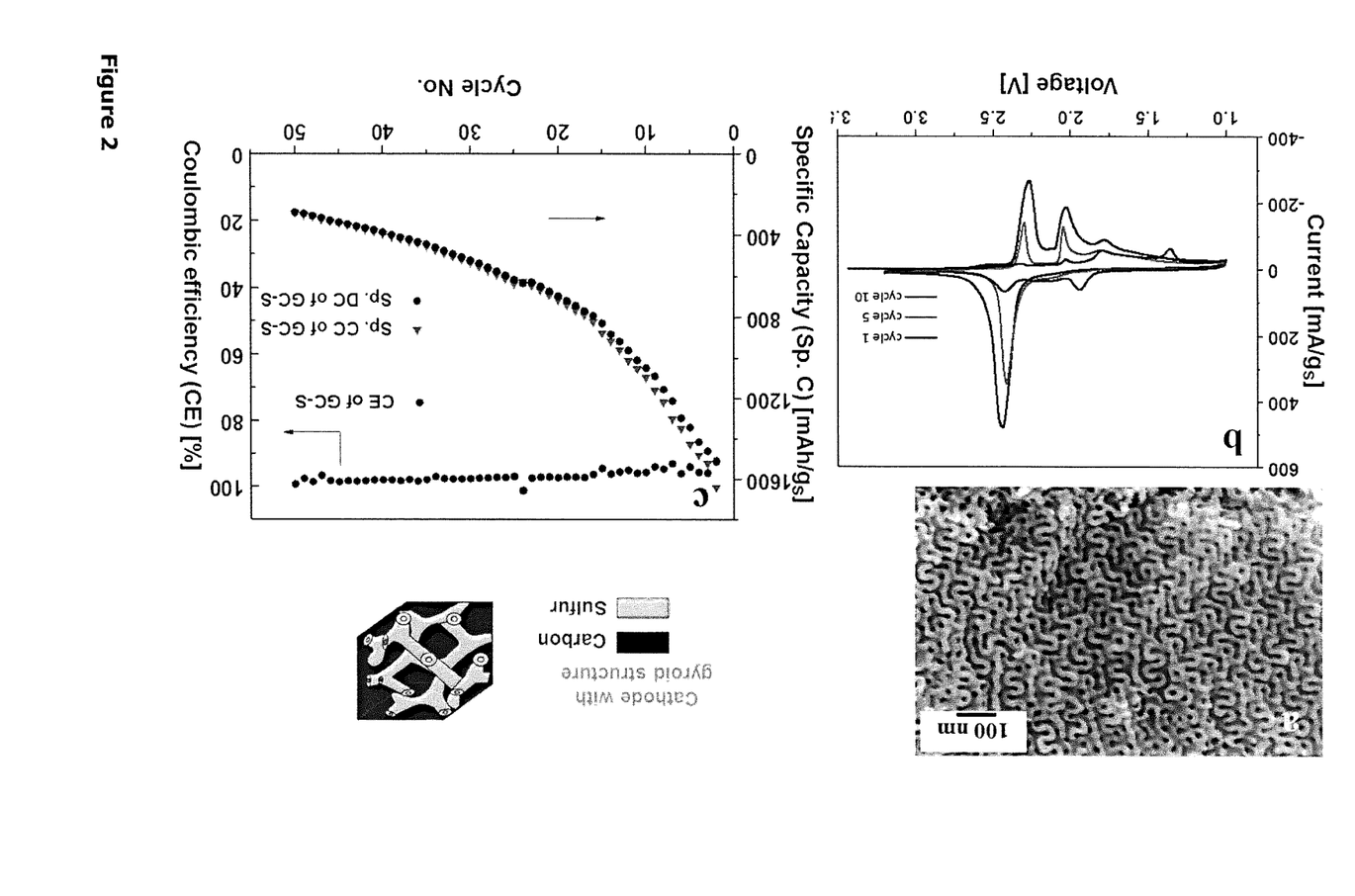
FIG. 2a shows an SEM image of the product of the porous carbon obtained in Example 1.
FIG. 2b shows the cyclovoltametric measurement of the cathode produced in Example 1 and FIG. 2c shows its charge/discharge measurements.

FIG. 2a further shows a SEM image of the obtained porous carbon. The regular structure deriving from the gyroid structure of the template is clearly visible.

A further preferred combination of the aforementioned block copolymer and the aforementioned amphiphilic molecule is the use of a polystyrene—poly(4-vinylpyridine) block copolymer in combination with 2-(4'-hydroxyphenylazo)benzoic acid as the amphiphilic molecule. Preferred is therefore a process as aforementioned wherein the solution in step a) comprises polystyrene—poly(4-vinylpyridine) block copolymer and 2-(4'-hydroxyphenylazo)benzoic acid. Most preferably the solution in step a) consists of one or more solvents, polystyrene—poly(4-vinylpyridine) block copolymer and 2-(4'-hydroxyphenylazo)benzoic acid. Such solutions form upon evaporation of the solvent in step b) of the aforementioned process complexes of the polystyrene—poly(4-vinylpyridine) block copolymer with 2-(4'-hydroxyphenylazo)benzoic acid that have a gyroid morphology.

A further preferred process of the present invention is therefore a process as described above comprising the following steps:
a) providing a 20 wt % solution of polystyrene—poly(4-vinylpyridine) block copolymer with 2-(4'-hydroxyphenylazo)benzoic acid in N,N-dimethylformamide-tetrahydrofuran mixed solvent,
b) producing a body by partial evaporation of the solvent followed by phase inversion,
c) removal of the amphiphilic molecules by selective washing with ethanol to produce a template comprising voids,
d) filling of at least part of the voids with a starting material for the preparation of a cross-linked resorcinol-formaldehyde resin, and subsequent heating of the starting material to form a cross-linked resorcinol-formaldehyde resin
e) and carbonization of the precursor for the formation of the porous carbon structure and removal of the block copolymer by heating.

The process is analogous to that described in FIG. 1. The product of this process has a very high conductivity which is around 222.4 mS/cm.

The present method allows for the preparation of a wide variation of the properties of the prepared carbon structures, by variation of the block copolymer and the amphiphilic molecules.

Further preferred is a process as described herein, wherein the template comprising the precursor for the formation of the porous carbon structure is heated to more than 600° C., more preferably to 900° C. to carbonize the precursor for the formation of the porous carbon structure and to remove the template.

A further preferred process of the present invention is a process as described herein wherein the template comprises inorganic oxide particles, in particular a mixture of inorganic oxide particles with a bimodal particle size distribution, which are removed from the template by etching with a suitable acid or base and wherein the template comprises voids between the particles. More preferred is such a process wherein the template consists of inorganic oxide particles with a bimodal particle size distribution. The inorganic oxides forming the template should be chosen in such a way that they should not react or should not be soluble in the void filling material or any of its components The present invention therefore also concerns in general a process for the preparation of a porous carbon structure comprising the following steps:
a) providing a template comprising voids,
b) filling of at least part of the voids with a precursor for the formation of the porous carbon structure,
c) carbonizing the precursor for the formation of the porous carbon structure and
d) removing at least part of the template,
wherein the template comprises a mixture of inorganic oxide particles with a bimodal particle size distribution, which are at least partially removed in step d) by etching with a suitable etchant and wherein the template comprises voids between the particles.

In a preferred embodiment, the inorganic oxide particles with a bimodal particle size distribution are selected from the group comprising silicon dioxide, titanium dioxide, aluminium oxide, vanadium(V) oxide and zinc oxide. In a more preferred embodiment, the inorganic oxide particles are silicon dioxide particles.

Figure 5:
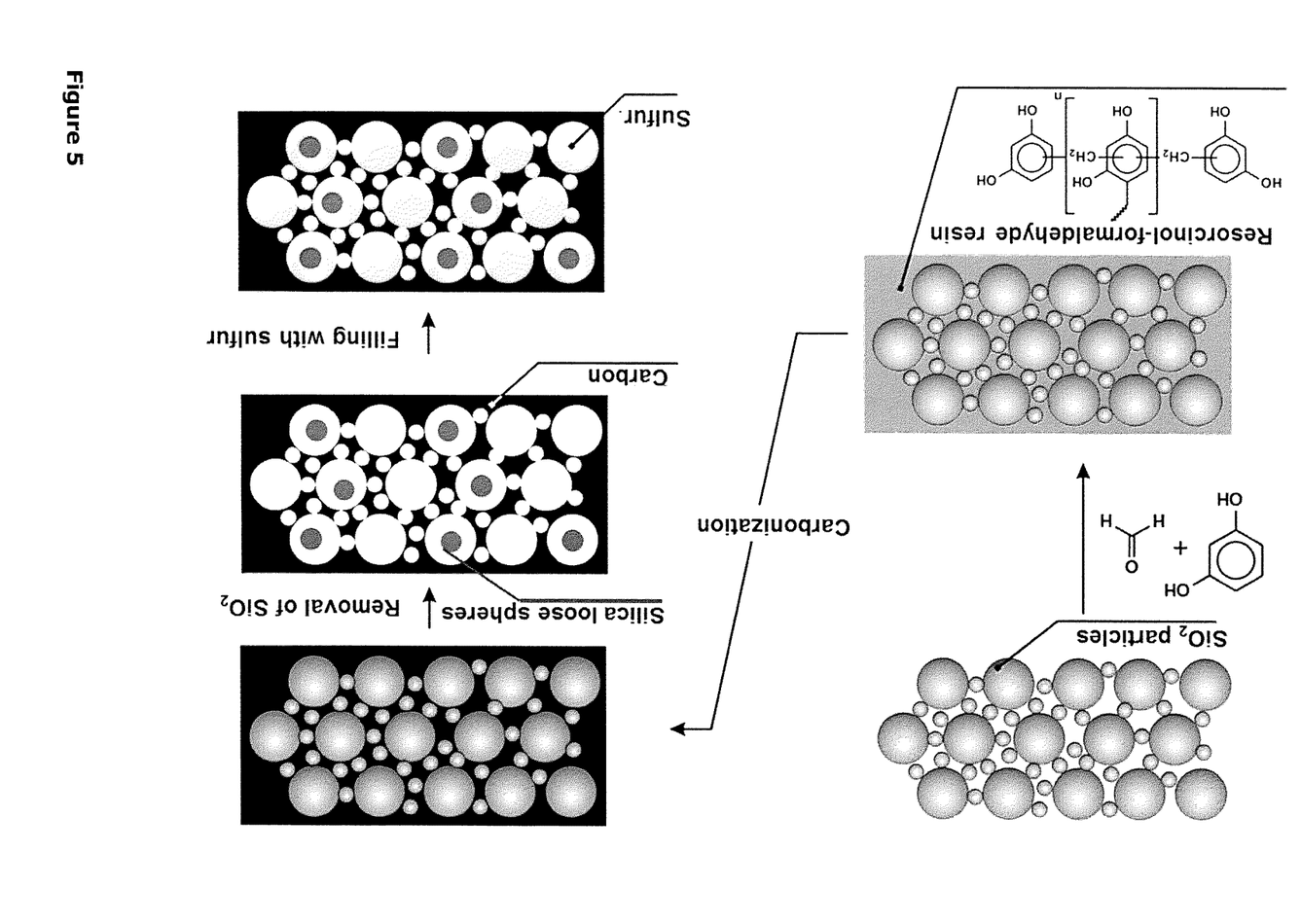
FIG. 5 depicts the process of the present invention according to Example 3, wherein silicon dioxide particles are comprised in the template.

According to one preferred embodiment, the etchant is a fluoride-containing gas. According to another preferred embodiment, the suitable etchant is an acid or a base, preferably the suitable etchant is hydrofluoric acid (HF). The other etchant for preferred embodiment can be buffered hydrofluoric acid (mixture of NH4F (40 wt. %) and HF (49 wt %) in 6:1 v/v ratio, hot concentrated potassium hydroxide/sodium hydroxide etc. The etchants can be chosen depending on their ability to solubilize or wash away the template but keeping the porous carbon unaltered. Such a process is exemplarily depicted in FIG. 5 for the case of silicon dioxide particles as inorganic oxide particles.

Preferably the template comprises inorganic oxide particles with a diameter of 100 nm or less and particles with a diameter of 500 nm or more, more preferably the template comprises inorganic oxide particles with a diameter of 60 nm or less and particles with a diameter of 1 µm or more. Further, the particles preferably have a spherical shape. In a preferred embodiment of the present invention, the partial removal of bimodal particles in step d) of the above process removes the particles of a smaller size and only partially etches the particles of a larger size to create adsorption sites for polysulfides.

The cyclovoltametry curves of cathodes prepared by such a process demonstrate typical charge/discharge behavior of Li—S batteries. They have large charge/discharge capacities of around 800 $mAh/g_s$ after the second discharge, which corresponds to ca. 50% of the theoretical specific capacity of a sulfur electrode.

It is very interesting that this cathode material, demonstrates relatively slow decay of the change/discharge capacity which remains around 600 mAh/$g_s$ after 50 cycles. The most probable reason of improved cycling behavior is adsorption of polysulfides on material from the $SiO_2$ particles which remains in the porous carbon. As result polysulfides remain entrapped within the cathode and do not diffuse to the anode to form $Li_2S$ and $Li_2S_2$. In other words, the use of $SiO_2$ particles allows the suppression of the polysulfide shuttle. This effect is also possible with other inorganic oxide particles already mentioned.

In fact, the effect of inorganic oxide particles e.g. silica can also be loaded into the porous network of carbon (particle size should be well below the pore diameter of the carbon to accommodate the silica particle inside) and an improvement of capacity decay minimizing the polysulfide shuttle can be expected. This additional loading may be advantageously combined with any process for the preparation of a porous carbon structure as described herein. The loading of the inorganic oxide particles that are promising candidates for polysulfide shuttle inhibitor can be loaded by dipping the porous carbon in a suspension of the inorganic oxide particles (particle loading 1-20 wt % in water) for a while (5-30 min) and heating further at 100° C. followed by drying at 80° C. under vacuum. Preferably, the inorganic oxide particles loaded into the porous carbon network have a diameter of 200 nm or less, preferably of 100 nm or less, more preferably of 60 nm or less. Also preferably, the inorganic oxide particles loaded into the porous carbon network have a diameter of 10 nm or more, preferably of 30 nm or more, more preferably of 50 nm or more.

Therefore, according to a preferred embodiment, any process as described herein may include a step of loading inorganic oxide particles into the porous carbon structure, more preferably these inorganic oxide particles are selected from the group comprising silicon dioxide, titanium dioxide, aluminium oxide, vanadium(V) oxide and zinc oxide, even more preferably the inorganic oxide particles are silicon dioxide particles. The present invention further includes the use of inorganic oxide particles, in particular of silica particles, within a porous carbon structure for the preparation of a battery.

A process as described herein is preferred wherein the precursor for the formation of the porous carbon structure is a crosslinked formaldehyde-phenol resin, which is formed by filling of at least part of the voids of the template with starting material for the preparation of the crosslinked formaldehyde-phenol resin and crosslinking the starting material for the preparation of the crosslinked formaldehyde-phenol resin. Thereby preferably the template is heated to 60 to 110° C. to form the crosslinked formaldehyde-phenol resin from the starting material for the preparation of the crosslinked formaldehyde-phenol resin.

A further embodiment of the present invention is a porous carbon structure prepared according to a process as described herein, a cathode prepared therefrom and a battery comprising such a porous carbon structure.

Finally, a further embodiment of the present invention is the use of a template comprising voids for the preparation of a porous carbon structure, wherein the template comprises a block copolymer and an amphiphilic molecule and wherein the block copolymer comprises polymeric units of at least one lipophilic monomer and polymeric units of at least one hydrophilic monomer. In this embodiment the block copolymer and the amphiphilic molecule may be any block copolymer and the amphiphilic molecule described herein. Preferably the block copolymer and the amphiphilic molecule are those described as herein preferred.

A preferred embodiment of the present invention encompasses the use of the porous carbon structure obtained by any of the processes described herein as sulfur-carbon cathodes. According to an alternative preferred embodiment of the present invention, the use of the porous carbon structure obtained by any of the processes described herein for lithium-sulfur batteries is envisaged. According to a particularly preferred embodiment, the aforementioned porous carbon structure is used as sulfur-carbon cathodes in lithium-sulfur batteries.

All embodiments of the present invention as described herein are deemed to be combinable in any combination, unless the skilled person considers such a combination to not make any technical sense.

BRIEF DESCRIPTION OF THE FIGURES

FIG. 4d shows the cyclovoltametric measurement of the cathode produced in Example 2 and FIG. 4e shows its charge/discharge measurements.

EXAMPLES

Measurement Methods:

Cyclovoltametric measurements: The cyclic voltammetry measurements of the lithium-sulfur batteries with different cathodes have been performed in between 1 V-3 V at a scanning rate of 0.05 mV/s. The details of the method is described in Agrawal, M.; Choudhury, S.; Gruber, K.; Simon, F.; Fischer, D.; Albrecht, V.; Gabel, M.; Koller, S.; Stamm, M.; Ionov, L, Porous carbon materials for Li—S batteries based on resorcinol-formaldehyde resin with inverse opal structure, Journal of Power Sources 2014; 261, 363-370.

Charge/discharge measurements: The galvanostatic charge/discharge measurement was done following the method described in Agrawal, M.; Choudhury, S.; Gruber, K.; Simon, F.; Fischer, D.; Albrecht, V.; Göbel, M.; Koller, S.; Stamm, M.; Ionov, L, Porous carbon materials for Li—S batteries based on resorcinol-formaldehyde resin with inverse opal structure, Journal of Power Sources 2014; 261, 363-370.

XPS: X-ray photoelectron spectroscopy of all carbon samples were done using the protocol described in Agrawal, M.; Choudhury, S.; Gruber, K.; Simon, F.; Fischer, D.; Albrecht, V.; Göbel, M.; Koller, S.; Stamm, M.; Ionov, L, Porous carbon materials for Li—S batteries based on resorcinol-formaldehyde resin with inverse opal structure, Journal of Power Sources 2014; 261, 363-370. Raman spectroscopy: Raman spectroscopy of the carbon samples were done in the way described in Agrawal, M.; Choudhury, S.; Gruber, K.; Simon, F.; Fischer, D.; Albrecht, V.; Göbel, M.; Koller, S.; Stamm, M.; Ionov, L, Porous carbon materials for Li—S batteries based on resorcinol-formaldehyde resin with inverse opal structure, Journal of Power Sources 2014; 261, 363-370.

The XPS and Raman spectra of the carbon material are indicative of the conducting nature (extent of graphitic nature). In all three of the examples the carbon precursor were kept the same to keep the nature of the carbon, so the XPS and Raman spectra are very similar in all cases.

Example 1

Polystyrene-poly(4-vinylpyridine) Block Copolymer and of 3-pentadecylphenol 44.3 mg of polystyrene—poly(4-vinylpyridine) block copolymer (obtained from Polymer Source Inc.) and 30.7 mg of 3-pentadecylphenol where dissolved in 5 ml chloroform. The solution was placed in a small bottle in a closed chamber together with six small bottles filled with chloroform for 11 days. During this period the block copolymer attains the stable gyroid morphology. Afterwards, the solvent was slowly evaporated for 5 more days and a 100 μm thick film resulted. The obtained block copolymer 3-pentadecylphenol complex film was inserted into 10 ml of ethanol for a time of 24 hours to obtain the template. FTIR spectroscopy was used to confirm the supramolecular association of the nitrogen atom of the pyridine group with the hydroxyl group of 3-pentadecylphenol. Subsequently, the template was immersed in a solution of 5 ml resorcinol-formaldehyde resin (prepared by mixing resorcinol and formalin solution in 1:1.8 molar ratio catalyzed by 0.1 ml of 1% $Na_2CO_3$ solution, all chemicals obtained from Sigma Aldrich, Germany), which was used as starting material for impregnation. Then the sample is heated, resulting in the formation of cross-linked resorcinol-formaldehyde resin inside the template. Finally, the resin-filled template is pyrolyzed at 800° C. for a time of 2 hours in the flow of argon to obtain a highly porous gyroid carbon replica. Pyrolysis of the samples not only converts the cross-linked resin into carbon but also removes the block copolymer phase leaving behind the interconnected porous carbon network with high surface area, which is 885 $m^2/g$. Porous carbon material was pre-mixed with sulfur powder in a mortar in 1:2 w/w ratio in a mortar followed by mixing in a ball mill for even intensive mixing and subsequently heat treated at 155° C. for 5 h in an oven operated under argon. Heat treatment at 155° C. was done to facilitate the pore coverage by sulfur in to the entire available surface area of carbon.

A cathode was produced via the following route. Cathode slurry of desired viscosity was prepared by adding carbon-sulfur composite material (82 wt %), blended with, Super P® Li (10 wt %) conducting additive (carbon black) in a solution of PVdF in N-Methyl-2-pyrrolidone (8 wt % with respect to 82 wt % of carbon-sulfur composite). A thin layer of the as prepared slurry was coated on nickel foil (60-80 μm wet thickness) and disc shaped cathodes were cut out from the whole piece after proper drying in a vacuum oven for 2 days. Cyclovoltametric measurements of this cathode performed as described above show two reduction peaks at 2.4 V and 2 V. The result of the measurements is shown in FIG. 2b. A lithium sulfur battery was assembled in the following way. Resulting electrodes had a mass load of 0.40 mg $cm^{-2}$ in dry state and a sulfur content of 55 wt %. A Swagelok® T-cell was used as testing device. Carbon-sulfur composite electrode served as working electrode, lithium metal served as counter and reference electrode respectively. 1 M solution of lithium bis(trifluoromethane sulfonyl)imide (LiTFSI) in a mixture of 1,2-Dimethoxyethane/1,3-Dioxolane (1/1, v/v)) was used as electrolyte, which was used to soak the non-woven polypropylene separator during cell assembly. The charging curve of the battery is represented by a typical single peak at 2.4V. It was found that cathode demonstrate moderate capacity in the first charge/discharge cycle, which is about 1600 mAh/$g_s$. The charge/discharge curve for the first 50 cycles is depicted in FIG. 2c. The capacity rapidly decreases during cycling and reaches the value of around 300 mAh/$g_s$ after 50 cycles. The rapid capacity degradation may be due to the well-known problems occurring in lithium sulfur batteries, like the dissolution of long chain polysulfides in the polar electrolyte solvent and the subsequent migration to and direct reduction at the lithium anode during cycling (polysulfide shuttle).

Example 2

Figure 3:
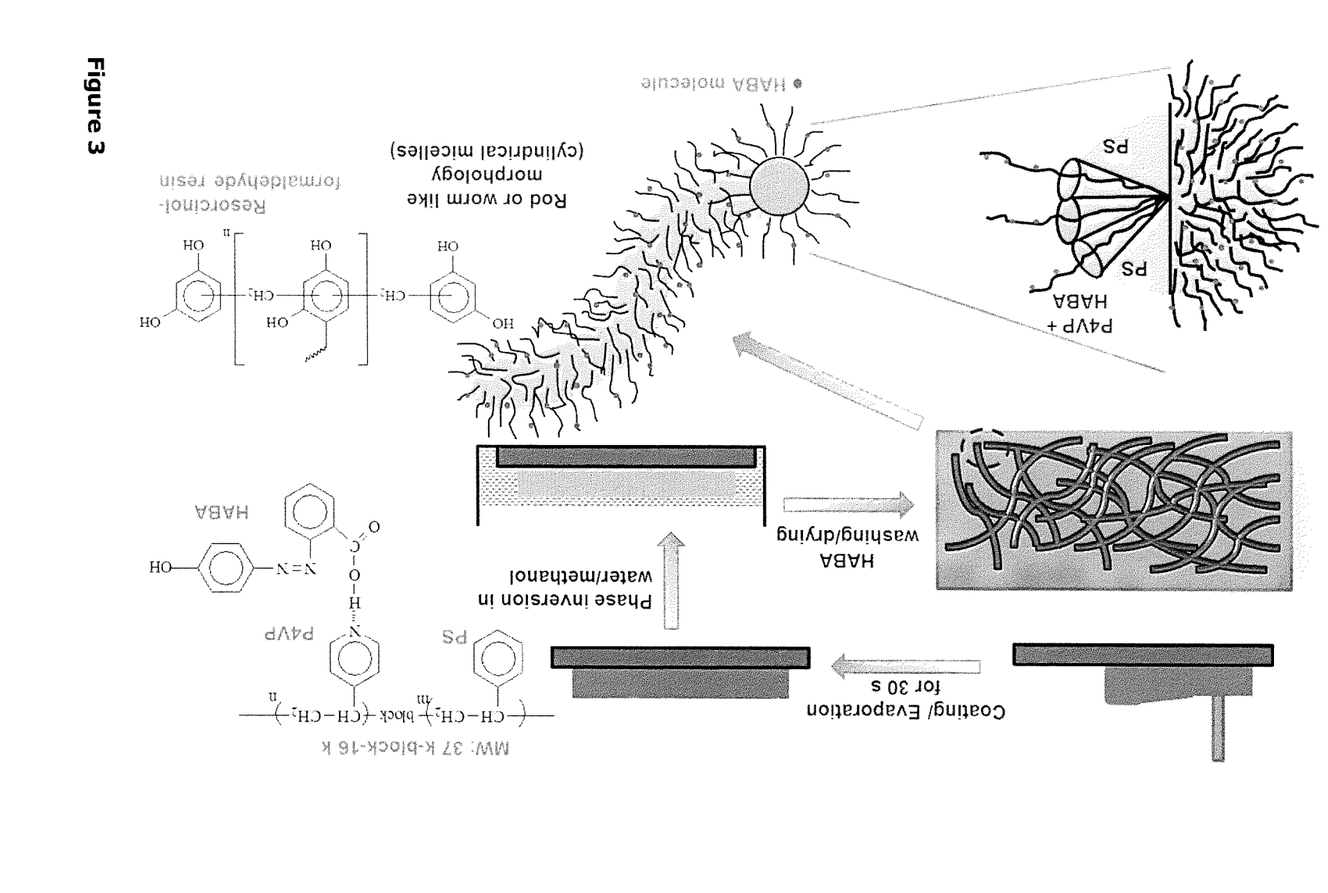
FIG. 3 shows the scheme of fabrication of porous carbon using block copolymer via phase inversion route as described in Example 2.

Polystyrene-poly(4-vinylpyridine) Block Copolymer and of 2-(4'-hydroxyphenylazo) benzoic acid Example 2 is performed as Example 1, however instead of 30.7 mg of 3-pentadecylphenol, 202.8 mg of 2-(4'-hydroxyphenylazo)benzoic acid is used. A 5 ml 20 wt. percent solution of the block copolymer and 2-(4'-hydroxyphenylazo)benzoic acid in 1:1 molar ratio of 2-(4'-hydroxyphenylazo)benzoic acid to 4-vinylpyridine unit is prepared in 56:24 w/w ratio of N,N-dimethylformamide/tetrahydrofuran solvent mixture and casted on a substrate to form 100 μm thick films. After 30 seconds the film formed is immersed in a water/methanol mixture, resulting in the phase inversion. The phase inverted membrane was washed to get rid of 2-(4'-hydroxyphenylazo)benzoic acid and to get template comprising void spaces. This template is a block copolymer mat consisting of cylindrical micelles where polystyrene forms the core and poly(4-vinylpyridine) part pointing outward (FIG. 3). Subsequently, the nanoporous carbon was prepared with the help of the template by following the same procedure described in claim 1.

Figure 4:
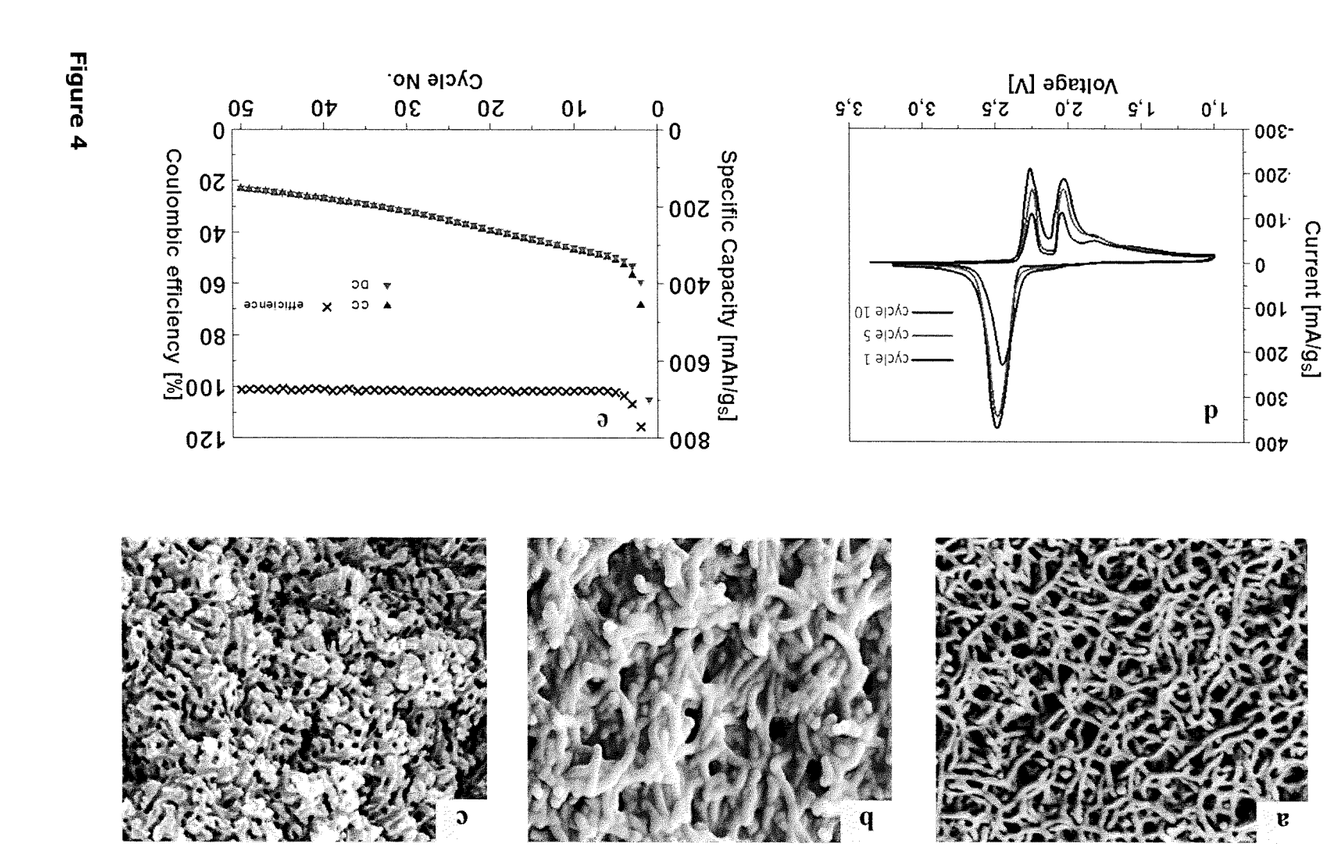
FIG. 4 shows the SEM image of (a) block copolymer template, (b) after filling the template with resorcinol-formaldehyde resin and (c) porous carbon after pyrolysis of the template obtained in Example 2.

The obtained carbon has very high conductivity 222.4 mS/cm. The carbon was mixed with elemental sulfur in molten state to get carbon-sulfur composite as cathode powder in the same way as described in claim 1. The cyclic voltammetry curves look like typical ones characteristic to Li—S batteries (FIG. 4d). It was found that cathode demonstrate moderate capacity in first charge-discharge cycle, which is in the range 600-800 mAh/$g_s$. The capacity however rapidly decreases during cycling and reaches the value of around 100 mAh/$g_s$ after 50 cycles that is due to polysulfide shuttle (FIG. 4e).

Example 3

Bimodal Silicon Dioxide Particles

Example 3 is also performed as Example 1 and 2 but differs only in the template. In Example 3, inorganic template was used instead of using polymeric template but the carbon precursor is the same in all three claims which is resorcinol-formaldehyde resin. 40 nm $SiO_2$ particles were prepared in the following way. 455 mg of L-Arginin dissolved in 345 ml of water then 25 ml of cyclohexane was added. Then it was heated to 60° C. After this 27.5 ml of Tetraethyl orthosilicate (TEOS) was added and stirred for 48 hours yielding 70% of $SiO_2$. Then cyclohexane was separated by separating funnel and solution was concentrated up to ~conc. 450 mg/ml in a rotary evaporator.

A mixture of 4 ml of dispersion of as synthesized 40 nm of silica particles that corresponds to 1.8 g and 200 mg of 1 µm amine functionalized silica microparticles (obtained from Kisker Biotech GmbH & Co.) were ultrasonicated for 1 hour until a nice dispersion of particles were achieved. 0.2 g of resorcinol was added to the dispersion and stirred for complete dissolution followed by addition of sodium carbonate solution (20 mg in 0.5 ml of water) which acts as catalyst. Afterwards, 0.25 ml of formaldehyde was added. The total mixture formed a gel immediately upon addition of formaldehyde. In order to obtain dispersion again ~1 ml of water was added and kept stirring over the weekend, drying the residual water in a water bath. Then the gelled material was kept in a close vessel and crosslinked at 80° C. for 4 days to avoid any changes in the nanostructure arising out of the flow of polymer. Finally, resulting dark brown colored material were carbonized at 800° C. at a heating rate of 4° C./min for 2 h in an argon atmosphere. Thereafter, a nanoporous carbon was prepared by etching silica particles by dilute hydrofluoric acid. The removal of silica particles was done by dipping the pyrolyzed carbon-silica mixture in 400 ml of 1 wt % dilute hydrofluoric acid. It was followed by washing with water several times and drying in a vacuum oven.

The obtained carbon has poor conductivity relative to two other systems studied so far of 13 mS/cm. The poor conductivity was due to leftover 20 wt % of silica particles which was washed only from the periphery and stayed inside the system like loose spheres. During etching out of silica particles it was controlled considering the reaction of silica with hydrofluoric acid ($SiO_2 + 6HF \rightarrow H_2SiF_6 + 2H_2O$) so that all the 40 nm sized silica particles could be washed away and the 1 µm silica particles could be washed partially from the periphery and residing in the carbon matrix creating adsorption sites for polysulfides. The washing with hydrofluoric acid leads to the formation of bimodal porous carbon with polysulfide reservoir inside. These silica particles have advantages to retain the cycle stability by creating adsorption sites on the surface of such inorganic particle surfaces. The carbon was mixed with elemental sulfur in molten state to get carbon-sulfur composite as cathode powder in the same way as described in claim 1 and electrochemistry was also performed keeping the same parameter.

Figure 6:
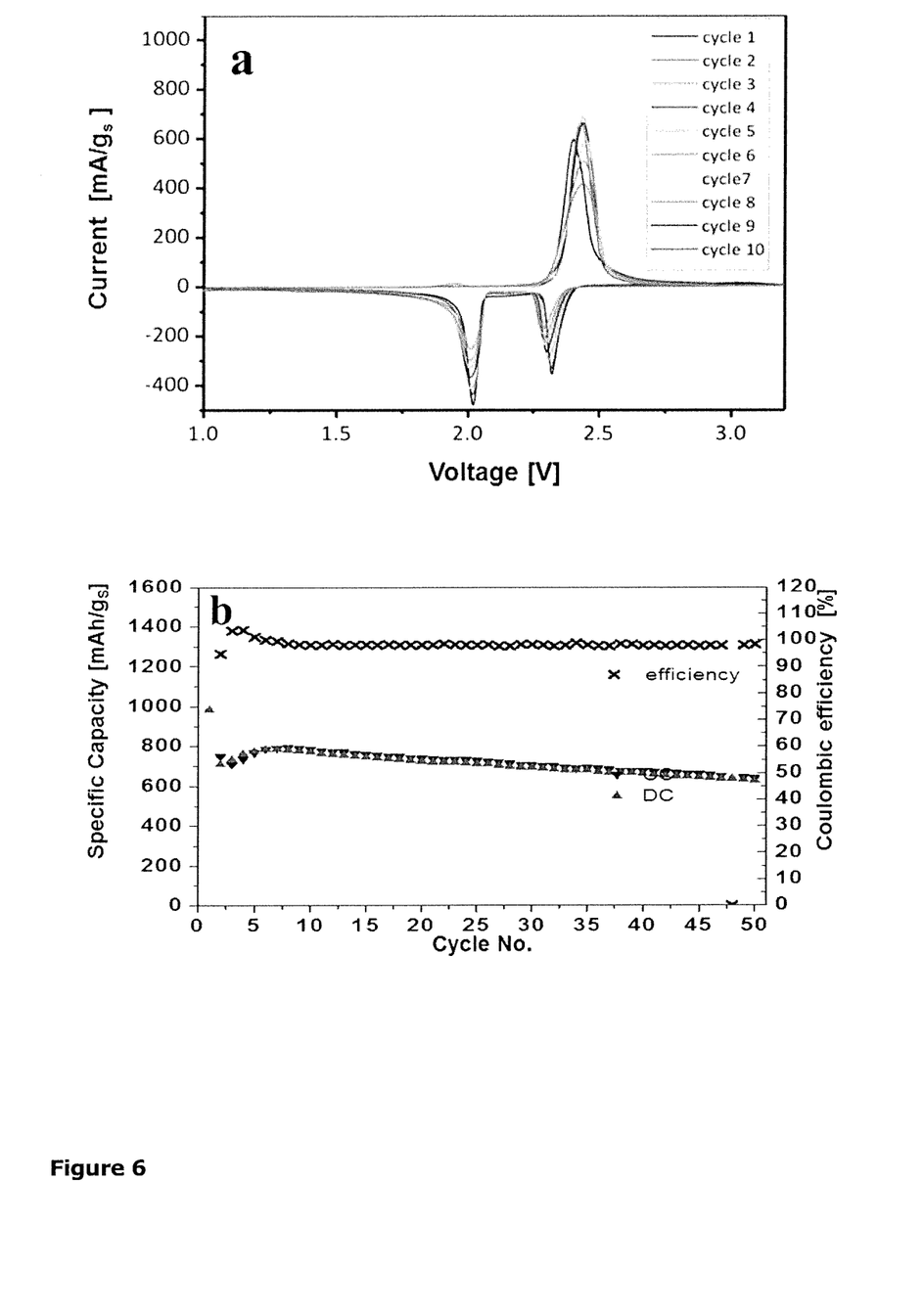
FIG. 6 depicts (a) the cyclovoltametric measurements and (b) charge/discharge measurements.
Figure 7:
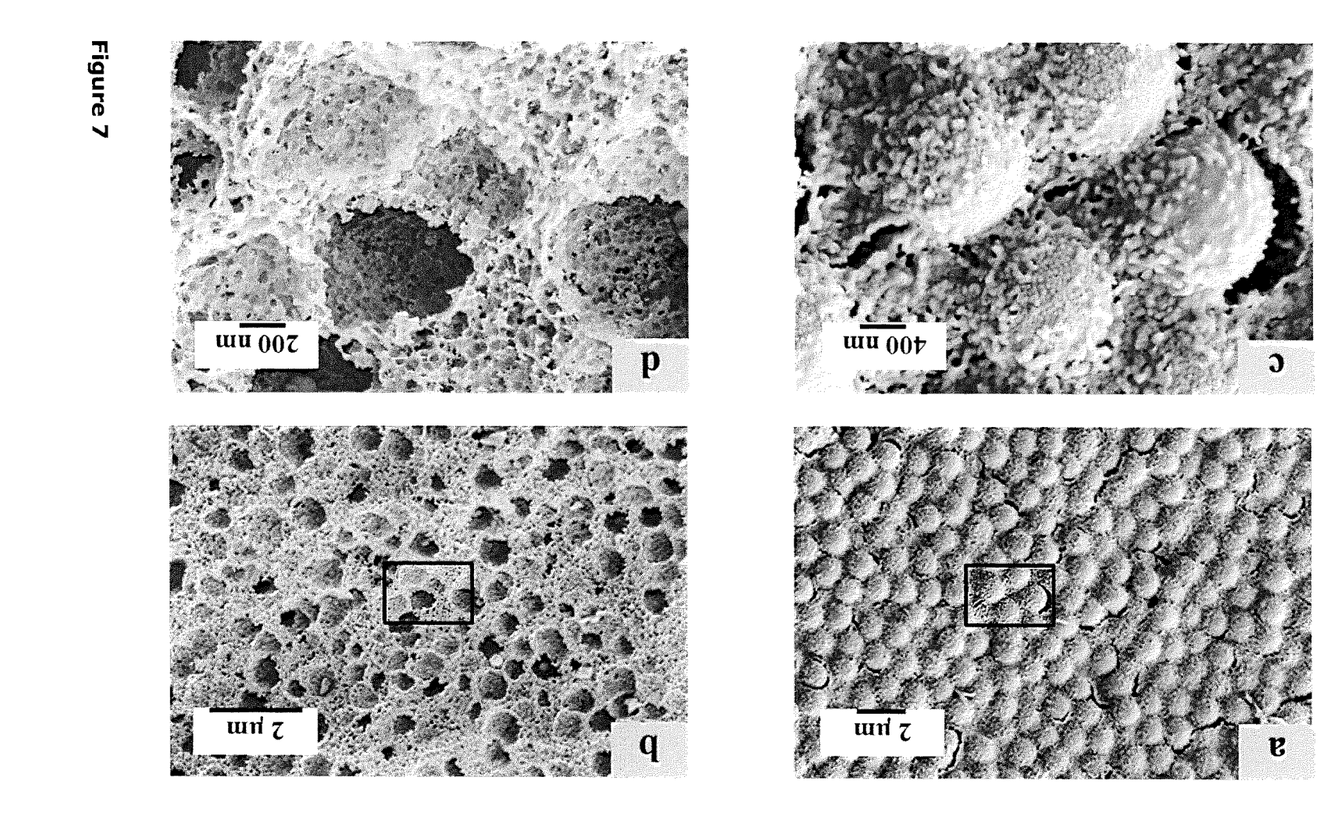
FIG. 7 shows SEM images of the final carbon structure according to Example 3 at different magnifications at the stage of (a, c) resin-silica after carbonization and (b, d) after etching of silica with HF.

The cyclic voltammetry curves look like typical ones intrinsic to Li—S batteries (FIG. 6a). Interestingly, from the charge-discharge experiment (FIG. 6b) it was found that the initial specific capacity started a bit low (800 mAh/$g_s$ in the second discharge cycle) which is nearly 50% of the theoretical specific capacity of sulfur electrode. Very interesting that contrary to other two cathode systems this one demonstrate quite good cycle stability reached to 600 mAh/$g_s$ up to 50 charging/discharging cycles. The stable cycle performance was due to the polysulfide adsorption on the surfaces of silica particles reside as loose spheres and polysulfides remain entrapped within cathode and do not diffuse to anode and avoid passivation of lithium anode by formation of $Li_2S$ and $Li_2S_2$ as well. This effect altogether helps in minimizing the active material loss per charging/discharging cycles.

The invention claimed is:

1. Process for the preparation of a porous carbon structure comprising the following steps:
    providing a solution comprising a solvent, a block copolymer and an amphiphilic molecule;
    producing a body by evaporation of the solvent;
    removing the amphiphilic molecule to produce a template comprising voids;
    filling at least part of the voids with a precursor for the formation of the porous carbon structure;
    carbonizing the precursor for the formation of the porous carbon structure; and
    removing at least part of the template,
    wherein, after carbonizing the precursor for the formation of the porous carbon structure, the method further comprises removing the block copolymer by heating,
    wherein the block copolymer comprises polymeric units of at least one lipophilic monomer and polymeric units of at least one hydrophilic monomer.

2. Process according to claim 1 further comprising obtaining a sulfur-carbon cathode or a lithium-sulfur battery from the porous carbon structure.

3. Process according to claim 1 wherein the amphiphilic molecule is removed by soaking the body in a solvent, optionally an ethanol/water or methanol/water mixture.

4. Process according to claim 1 wherein
    the hydrophilic monomer comprises at least one functional group selected from the group consisting of a nitrogen atom with one lone electron pair, an oxygen atom with two lone electron pairs and an fluorine atom and the amphiphilic molecule comprises at least one functional group selected from the group consisting of N—H and —O—H or the amphiphilic molecule comprises at least one functional group selected from the group consisting of a nitrogen atom with one lone electron pair, an oxygen atom with two lone electron pairs and a fluorine atom and the hydrophilic monomer comprises at least one functional group selected from the group consisting of N—H and —O—H.

5. Process according to claim 1 wherein the block copolymer is a polystyrene—poly(4-vinylpyridine) block copolymer.

6. Process according to claim 1 wherein the amphiphilic molecule is selected from the group consisting of 3-pentadecylphenol and 2-(4'-hydroxyphenylazo)benzoic acid.

7. Process according claim 1 wherein the template comprising the precursor for the formation of the porous carbon structure is heated to more than 600° C. to carbonize the precursor for the formation of the porous carbon structure and to remove the template.

8. Process according to claim 7 wherein the template comprising the precursor for the formation of the porous carbon structure is heated to about 900° C. to carbonize the precursor for the formation of the porous carbon structure and to remove the template.

9. Process according to claim 1 wherein the template comprises a mixture of inorganic oxide particles with a bimodal particle size distribution, which are at least partially removed in step d) by etching with a suitable acid or base and wherein the template comprises voids between the particles.

10. Process according to claim 9 wherein the inorganic oxide particles with a bimodal particle size distribution are silicon dioxide, titanium dioxide, aluminium oxide, vanadium(V) oxide or zinc oxide.

11. Process according to claim 10 wherein the inorganic oxide particles with a bimodal particle distribution are silicon dioxide particles.

12. Process according to claim 9 wherein the template comprises particles with a size of 100 nm or less and particles with a size of 500 nm or more.

13. Process according to claim 12 wherein the template comprises inorganic oxide particles with a size of 60 nm or less and particles with a size of 1 µm or more.

14. Process according to claim 9 wherein the suitable acid or base comprises hydrofluoric acid (HF).

15. Process according to claim 1 further comprising providing inorganic oxide particles within the porous carbon structure and preparing a battery from the porous carbon structure comprising the inorganic oxide particles.

16. Process according to claim 15, wherein the inorganic oxide particles are silica particles.

17. Process according to claim 1 wherein the precursor for the formation of the porous carbon structure is a cross-linked formaldehyde-phenol resin, which is formed by filling at least part of the voids of the template with a starting material for the preparation of the cross-linked formaldehyde-phenol resin and crosslinking the starting material for the preparation of the cross-linked formaldehyde-phenol resin.

18. Process according to claim 17 wherein the template is heated to 60 to 110° C. to form the cross-linked formaldehyde-phenol resin from the starting material for the preparation of the cross-linked formaldehyde-phenol resin.

19. Process according to claim 1 wherein the template further comprises a block copolymer and an amphiphilic molecule and wherein the block copolymer comprises polymeric units of at least one lipophilic monomer and polymeric units of at least one hydrophilic monomer.

20. Process for the preparation of a porous carbon structure comprising the following steps:
provinding a template comprising voids;
filling at least part of the voids with a precursor for the formation of the porous carbon structure;
carbonizing the precursor for the formation of the porous carbon structure; and
removing at least part of the template;
wherein the template further comprises a block copolymer and an amphiphilic molecule and wherein the block copolymer comprises polymeric units of at least one lipophilic monomer and polymeric units of at least one hydrophilic monomer.

* * * * *

UNITED STATES PATENT AND TRADEMARK OFFICE
CERTIFICATE OF CORRECTION

| | |
|---|---|
| PATENT NO. | : 10,651,471 B2 |
| APPLICATION NO. | : 15/534741 |
| DATED | : May 12, 2020 |
| INVENTOR(S) | : Choudhury et al. |

Page 1 of 1

It is certified that error appears in the above-identified patent and that said Letters Patent is hereby corrected as shown below:

On the Title Page

Item (30) Foreign Application Priority Data:
Delete "(EP) 14198594" and insert -- (EP) 14198594.5 --

Signed and Sealed this
Sixth Day of October, 2020

Andrei Iancu
*Director of the United States Patent and Trademark Office*